(12) United States Patent
Pletcher et al.

(10) Patent No.: US 9,044,003 B2
(45) Date of Patent: Jun. 2, 2015

(54) OVER-CENTER TRIGGER MECHANISM FOR ANIMAL CAGE TRAPS AND CONVERSION KIT

(71) Applicants: Dean Pletcher, Connellsville, PA (US); Caleb Moore, Indianhead, PA (US)

(72) Inventors: Dean Pletcher, Connellsville, PA (US); Caleb Moore, Indianhead, PA (US)

(*) Notice: Subject to any disclaimer, the term of this patent is extended or adjusted under 35 U.S.C. 154(b) by 111 days.

(21) Appl. No.: 13/753,267

(22) Filed: Jan. 29, 2013

(65) Prior Publication Data

US 2014/0208633 A1 Jul. 31, 2014

(51) Int. Cl.
*A01M 23/18* (2006.01)
*G05G 1/44* (2008.04)

(52) U.S. Cl.
CPC .................. *A01M 23/18* (2013.01); *G05G 1/44* (2013.01); *Y10T 74/20528* (2015.01)

(58) Field of Classification Search
CPC .... A01M 23/18; G05G 1/44; Y10T 74/20528
USPC ..................... 43/58, 60, 61; 74/512
See application file for complete search history.

(56) References Cited

U.S. PATENT DOCUMENTS

| | | | | |
|---|---|---|---|---|
| 2,232,604 A * | 2/1941 | Helmick | | 43/61 |
| 2,562,809 A * | 7/1951 | Mogren | | 43/61 |
| 3,585,750 A * | 6/1971 | Routt | | 43/61 |
| 4,187,634 A * | 2/1980 | Kintz | | 43/61 |
| 4,342,172 A * | 8/1982 | Guanci | | 43/61 |
| 4,549,368 A | 10/1985 | Bustle | | |
| 4,682,440 A * | 7/1987 | Hunter | | 43/61 |
| 5,778,594 A * | 7/1998 | Askins et al. | | 43/61 |
| 2010/0242338 A1 * | 9/2010 | Facklam | | 43/61 |
| 2011/0005122 A1 * | 1/2011 | Bucher | | 43/61 |
| 2011/0119987 A1 * | 5/2011 | Alter et al. | | 43/61 |

* cited by examiner

*Primary Examiner* — Bret Hayes
(74) *Attorney, Agent, or Firm* — Gary P. Topolosky

(57) ABSTRACT

A trigger mechanism for an animal cage having a door that can be closed by linking to hanging bait comprises a frame for mounting to that cage. The frame includes a first support pivotally mounted at its base end, a second support fixedly mounted substantially perpendicular to the frame; and a door actuation bar pivotally mounted to the frame at one end. That actuation bar connects to a latch on the cage door and pulls on that latch to close the door when an animal inside the cage engages bait hanging from a strike arm pivotally mounted at one end to the second frame support. A link arm pivotally mounted at one end to the first frame support connects at its opposite end to an intermediate point along the strike arm with varying levels of tension. A kit for converting animal cages from floor pedal actuation to this hanging bait improvement is also disclosed.

20 Claims, 19 Drawing Sheets

OVER-CENTER TRIGGER MECHANISM FOR ANIMAL CAGE TRAPS AND CONVERSION KIT

BACKGROUND OF THE INVENTION

1. Field of the Invention

This invention relates to cage traps for trapping small-to medium-sized animals without harming the animal for subsequent release and/or relocation. Such traps commonly comprise a cage of metal wire mesh with at least one trigger door. Upon entering, the animal typically trips a pedal on the cage floor for closing the door and trapping the animal inside. Such trap configurations are prone to sticking open or closing prematurely. This invention represents an improvement over such known cage trigger devices.

Prior art cage traps have specific setting and releasing mechanisms which typically include a floor pedal or "pan", trigger rod, latching device, door, locking device and spring member. To set such traps, the locking device is disengaged, the cage door opened and the latch set.

A problem with known cage traps is the complexity and unreliability of floor trigger/actuation mechanisms. With designs involving complicated set ups, the force required to trip the cage door can vary. If the required force is too great, the animal may avoid entrapment altogether. Alternately, there could be a bunch of false trips if one cannot consistently stabilize the cage into its set (i.e., pre-triggered) position. Hence, there is also a need for cage trap triggers that are not complex in mechanical design, easy to set, consistent in trip force, and yet more reliable to use.

2. Description of Relevant Art

There are several known representative prior art devices. They include the dual door trap device of Mogren U.S. Pat. No. 2,562,809; the pivotal jaw arms for the animal trap device of Bustle U.S. Pat. No. 4,549,368; the weight-adjusted, balancing gravitational trap of Kao et al U.S. Pat. No. 6,588,139 and over-centering latch mechanism from Bucher U.S. Pat. No. 7,757,427. None of the foregoing teaches or suggests the combination of aspects for the present invention shown and described herein.

SUMMARY OF THE INVENTION

The present invention is directed to a cage-type trap that includes a wire mesh animal enclosure made of a base, pair of opposed sidewalls emanating from the base, a rear wall secured to the sidewalls and base, a roof secured to the sidewalls and rear wall, and a front end provided with an animal access opening. A door is movably mounted at the front end and operates in an opened position to reveal the animal access opening and in a closed position to block said access opening. In some known variations of cages, there is both a front and rear access opening/door on the same model. Use of the present invention with a dual cage door makes for even easier hanging bait setting.

Many known varieties of such animal trapping cages require a floor pedal or pad connecting to means for operating cage door closure. Particularly, when an animal enters that cage for retrieving bait left on the floor of same, it steps on that pedal/pad and the weight of the animal thereon should trigger the door closure to commence trapping the animal inside. Such traps have shown their unreliability and vulnerability to either: sticking open and un-triggered, or triggering prematurely.

With the present invention, linkage to a floor pedal/pad can be eliminated. Instead, this improved over-center triggering mechanism comprises a frame for mounting to the cage, preferably to the top of said cage. That frame includes a first support pivotally mounted at its base end, a second support fixedly mounted substantially perpendicular to the frame; and a door actuation bar pivotally mounted to the frame at one end. This actuation bar connects to a latch on the cage door and pulls on that latch to close the door when an animal inside the cage engages bait hanging from a strike arm pivotally mounted at one end to the second frame support. A link arm pivotally mounted at one end to the first frame support connects at its opposite end to an intermediate point along the strike arm with varying levels of tension.

In a broader restatement, this invention also addresses a kit for converting animal cages from floor pedal to hanging bait actuation. Optional items for that kit include a protective cover for the door latch cable and/or an elongated arm for assisting with suspending the bait from inside the cage.

It is thus an object of the present invention to provide a cage trap demonstrating mechanical simplicity for ease of setting the trap and having significantly improved reliability once set. Currently tested models showed no failures due to the door closure not properly actuating or because the mechanism triggered prematurely.

It is another object of the present invention to provide a cage trap which can be safely and easily set, and from which a trapped animal can be safely and easily released. With the hanging bait of this invention located more intermediate the cage interior, trapping efficiency improves; the animal needs to move deeper into the trap to reach said bait and the back end of its body will less likely interfere with cage door closure allowing the animal to extricate a triggered trap.

It is yet another object of the present invention to provide a cage trap having a simplified mechanism for safely and easily setting the trap, with variably adjustable levels of tension, from a stable over-centering position on the trap.

Additional objects of this invention include providing a cage trap that is durable, reliable and easy to use (for both set and release). Yet another objective is to provide a tripping mechanism that works with new or retrofitted cages to enable animal trapping in a safe and humane manner, said tripping mechanism being relatively easy to make and assemble in a cost-effective manner.

BRIEF DESCRIPTION OF DRAWINGS

Further features, objects, and advantages of the present invention will be apparent to those skilled in the art upon reading the following detailed description made with reference to the accompanying drawings wherein.

DESCRIPTION OF PREFERRED EMBODIMENTS

Figure 1:
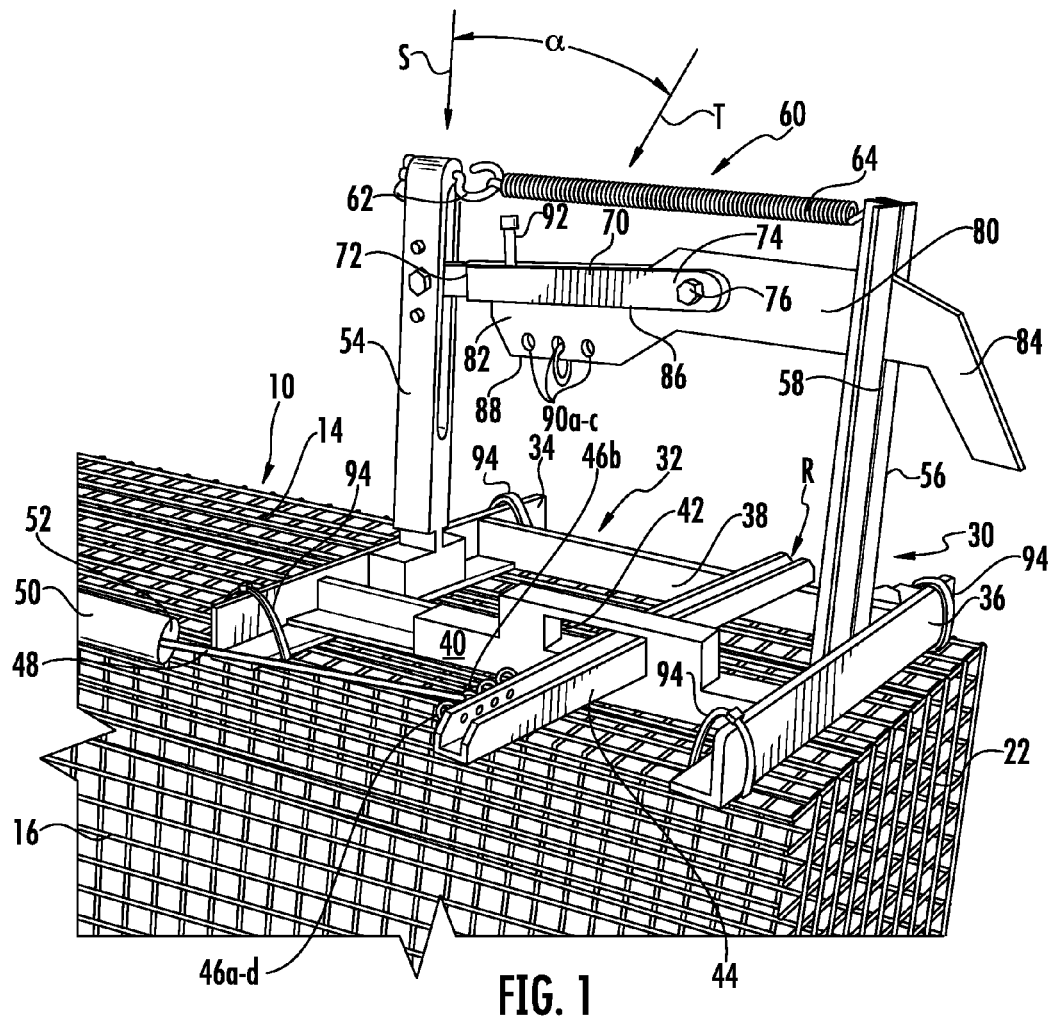
FIG. 1 is a left rear perspective view of a first embodiment of trigger mechanism in a set (or spring-loaded) position atop a typical animal wire mesh cage.
Figure 2:
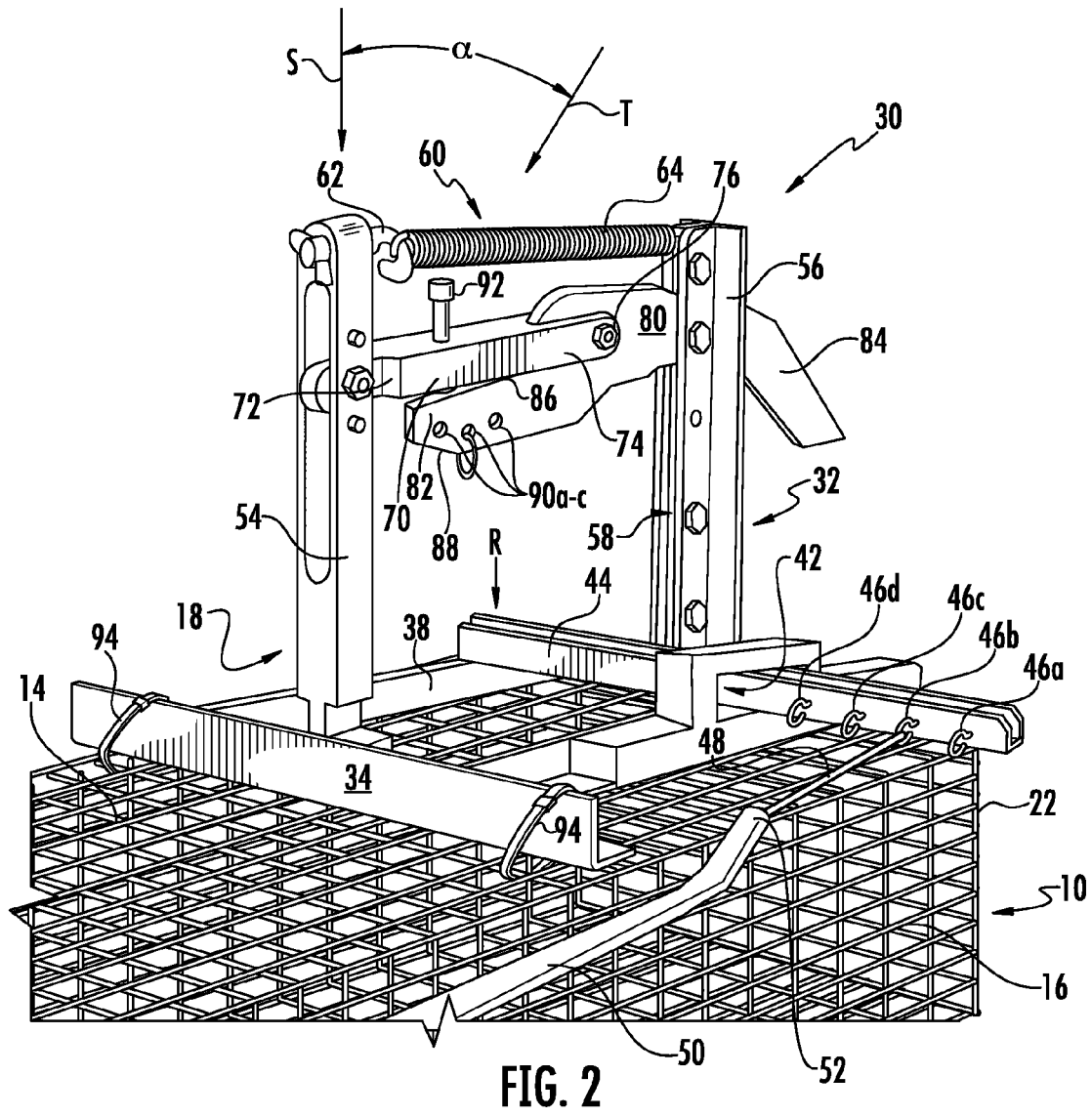
FIG. 2 is a left perspective view of the set trigger mechanism from FIG. 1 closer to the front or door end of that cage.
Figure 3:
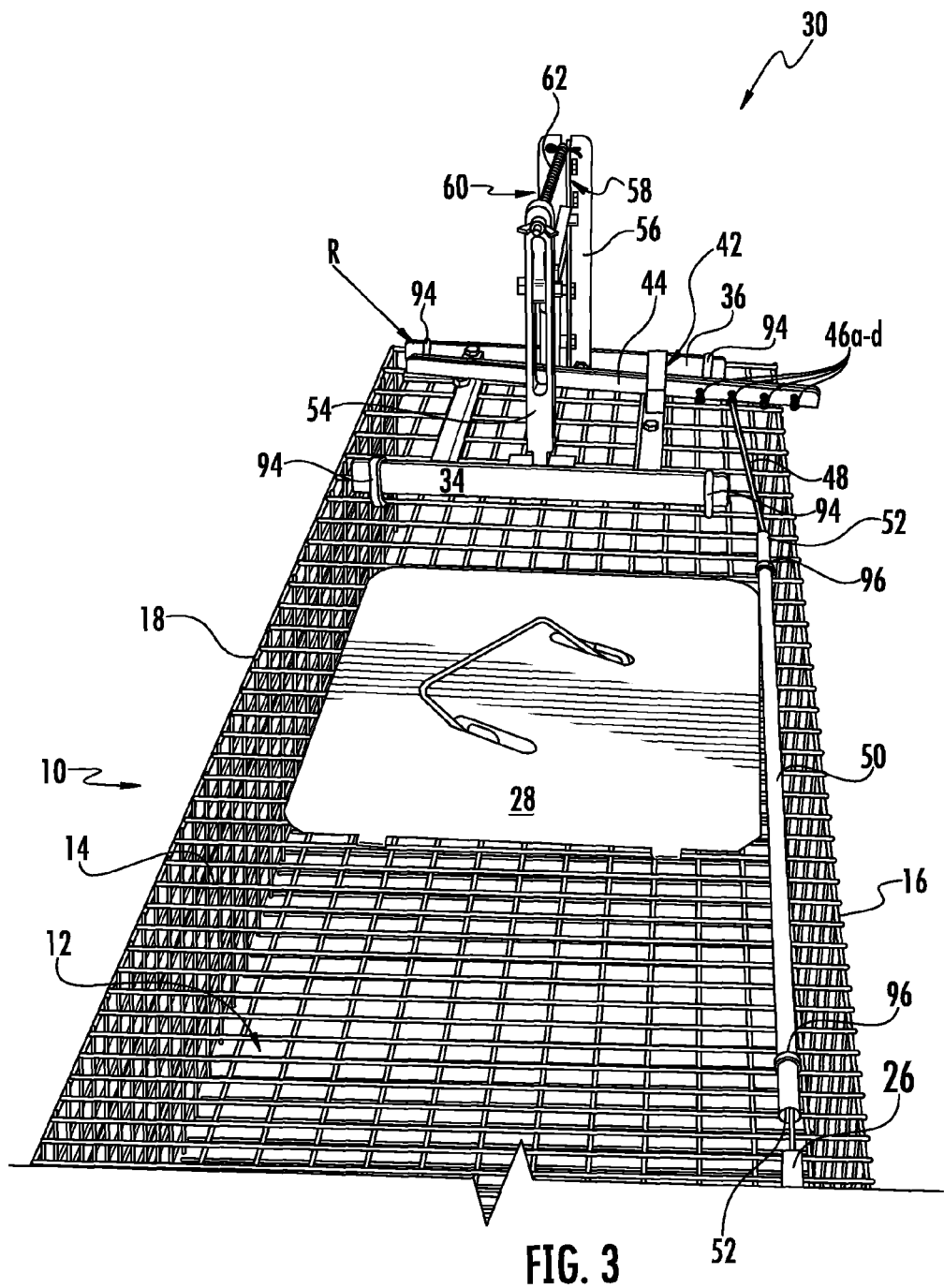
FIG. 3 is an upper perspective (axial) view of the aforementioned trigger mechanism linked to a cage front door release.
Figure 4:
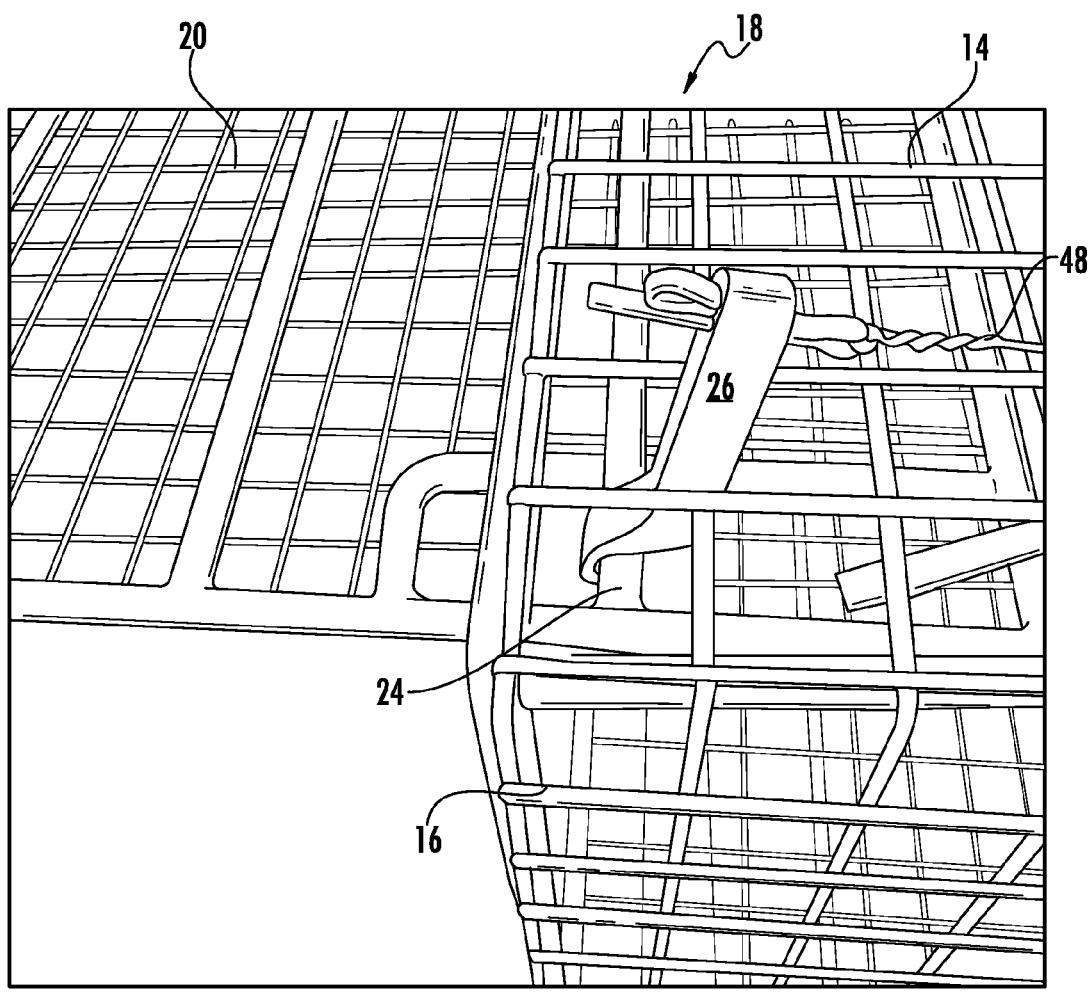
FIG. 4 is an exploded perspective view of the door latch from the circled region IV in FIG. 3.

In describing the preferred embodiments illustrated in the drawings, specific terminology is employed for the sake of clarity. However, the invention is not intended to be limited to the specific terms so selected. It is to be understood that each specific element includes all technical equivalents that operate in a similar manner to accomplish a similar purpose. Furthermore, common features in the different views of this invention are shown with the same reference numeral(s). For alternate embodiments of the same component, there is consistent numbering though in the next hundred series. When referring to any numerical range herein, it should be noted that all numbers within the range, including every fraction or decimal between its stated minimum and maximum, are considered to be fully designated and disclosed hereby.

Referring to FIGS. 1 through 4, there is shown a representative animal cage trap 10 generally rectangular in shape. The typical cage trap to which this invention attaches has an elongated base or floor 12, corresponding top or roof 14 and opposed sidewalls 16 and 18 preferably formed and/or folded from metal wire mesh. The base/floor and roof are also essentially parallel with one another and the sidewalls also parallel to each other. As shown, there is at least one hinged cage door 20, in this case in the front end of trap 10 with a mesh rear or back wall 22. The cage door 20 includes a ledge or lipped region 24 that when held by a pin, clip or door latch 26 will keep the door up/raised or otherwise "open". Note that alternate cage traps to which this device may be attached can have multiple entrances/exits, i.e., both a front and rear hinged door. Still other alternatives may include a solid metal floor/wall or roof rather than one made of wire mesh alone. Many such cage traps also include an integral carrying handle 28.

To catch/capture an animal in prior cages, a typical door actuation mechanism would include a floor/foot pan or pedal that, via linkage, otherwise releases a physical hold on the hinged door or a component thereof (similar to the lipped region 24/door latch 26 combination mentioned above). When an animal enters that trap, its weight alone should supply sufficient downward pressure on the pan/pedal to trip its link assembly and initiate lever movement causing the door to close and trap the animal inside. But that system has not proven to be failsafe. Too often, it will "stick" open OR trigger prematurely. Hence, the need for the replacement over-centering mechanism described below.

In FIGS. 1 through 5, and 6 through 9B, the first embodiment of triggering mechanism, generally 30, is depicted. Mechanism 30 consists of a main frame component 32 with three or more horizontally extending components. Two of those horizontal components are crossbars. In the FIGS., there is a forward crossbar 34 and rear crossbar 36, the latter closer to the rear wall 22 of cage 10. Extending substantially perpendicular to crossbars 34, 36, there is one, preferably two (or maybe more) distinct spacer bars. These spacer bars extend between the aforesaid crossbars with one of said spacer bars being a spacer pivot bar 38 and the other being more of the actuator guide spacer 40. The guide spacer 40 includes a slotted aperture 42 that defines the preferred range of actuation lever movement with the device (as described in more detail below).

Towards the distant end of the mechanism 30 as shown in the first embodiment, there is a door actuating bar or horizontally-extending lever 44. It is pivotally connected at a farther end (as shown) to spacer pivot bar 38 of main frame component 32. That may be by rivet, screw, rotatable headpin or any known or subsequently developed alternative. In the FIGS., that connection is marked as rivet region R.

At the opposite end to door actuating bar/lever 44, there are several eyelet latch hooks. Four are shown, elements 46a, b, c and d, for representative purposes. The invention may include several more or a few less, in the alternative. A wire, cable or other connection cord 48 hooks into one of those eyelets before passing along a sidewall (or the top) of cage 10 where it affixes at its opposite end to door latch 26. So as to prevent an animal in the outdoors from unduly tampering with that latch and rendering it inoperable (even prematurely tripping same), it is preferred that connection cord 48 be substantially guarded with its own elongated, protective cover 50. That cover 50, in its simplest form, may consist of a long hollow tube having apertures 52 through which connection cord 48 is threaded before connecting at opposite ends to door latch 26 forward of cage 10 and one of the eyelet latch hooks 46b (as shown).

Returning to the frame proper of mechanism 30, there are two substantially vertical supports connected to and rising upwardly from frame component 32. The first support 54 is pivotally mounted at its lower end (closest to the top/roof 14) to forward crossbar 34. Ideally, first support 54 moves between a set stage S and triggered stage T with the relative movement between stages being angle α, which may vary from about 15 to 40 total degrees. As shown, the first pivot support 54 of the first embodiment depicted connects to forward crossbar 34 while in the set stage S at a substantially right angle (or 90 degrees) to same. In the other main embodiment shown at FIGS. 10 through 17, a more arcuate starting (or set) angle is employed, said angle β ranging between about 70 to 80 or 85 degrees, rather than a full 90 degrees perpendicular to forward crossbar 34. Such angling assists in reducing the amount of tension needed to move that version's first support for set S to triggered T.

Opposite first support 54 in the first embodiment, there is a second support 56 fixedly attached to the rear crossbar 36. Preferably, second support 56 includes a vertically extending slot 58 through which other components extend and pivotally connect. At the top ends to both first (pivot) support 54 and second (fixed) support 56, there is a tension means 60 consisting of at least one eyehook connector 62 and spring 64. Below that arrangement, the mechanism 30 includes a pair of interconnecting fulcrum bars preferably at an intermediate point for both first support 52 and second support 54. The fulcrum bar shown toward the forward end of cage 10 serves as a link arm 70 and connects at its front end 72 to first support 52. At the opposite or rear end 74 of link arm 70, there is a permanent attachment via a rotatable nut and bolt 76 to the other fulcrum bar element of this arrangement, i.e. the rotatable, pivotally attached strike arm 80 that, when set, runs at or near parallel to link arm 70.

On a preferred basis, strike arm 80 has a forward extending end 82 and rear handle end 84, the latter extending at least partially through slot 58 in second support 56. A top surface 86 to forward extending end 82 abuts the front end 72 of link arm when the mechanism is placed in a set or loaded (under tension) condition. A bottom ledge 88 to that forward extending end 82 will engage with actuating bar/lever 44 when the device is triggered by animal tugging on bait suspended in the cage from one of several bait hanging apertures 90*a, b* or *c*. Three representative bait hook holes/apertures are shown though it is to be understood that fewer or more made be used as well.

Some variable adjustability in tension is imparted to preferred embodiments of this device by changing the relative contact point between fulcrum arms through manual adjustment (i.e., tightening or loosening) of threaded fulcrum bolt 92.

Lastly, there is shown one representative means for mounting mechanism 30 to the cage 10, more preferably to the top/roof 14 of said cage. Particularly, mounting may be easily accomplished with a series of tie down pull straps 94 about the respective corners of frame component 32. Alternately, eyehook bolts and nuts may be used or most any other known or subsequently developed means for rapidly yet securely affixing the invention to a new or existing (retrofitted) cage. To prevent the cover 50 from unnecessary rattling (by the elements, i.e. wind, etc. or upon an animal first entering the cage), it may be secured to a top or sidewall with one or more additional cover straps 96.

Figure 5:
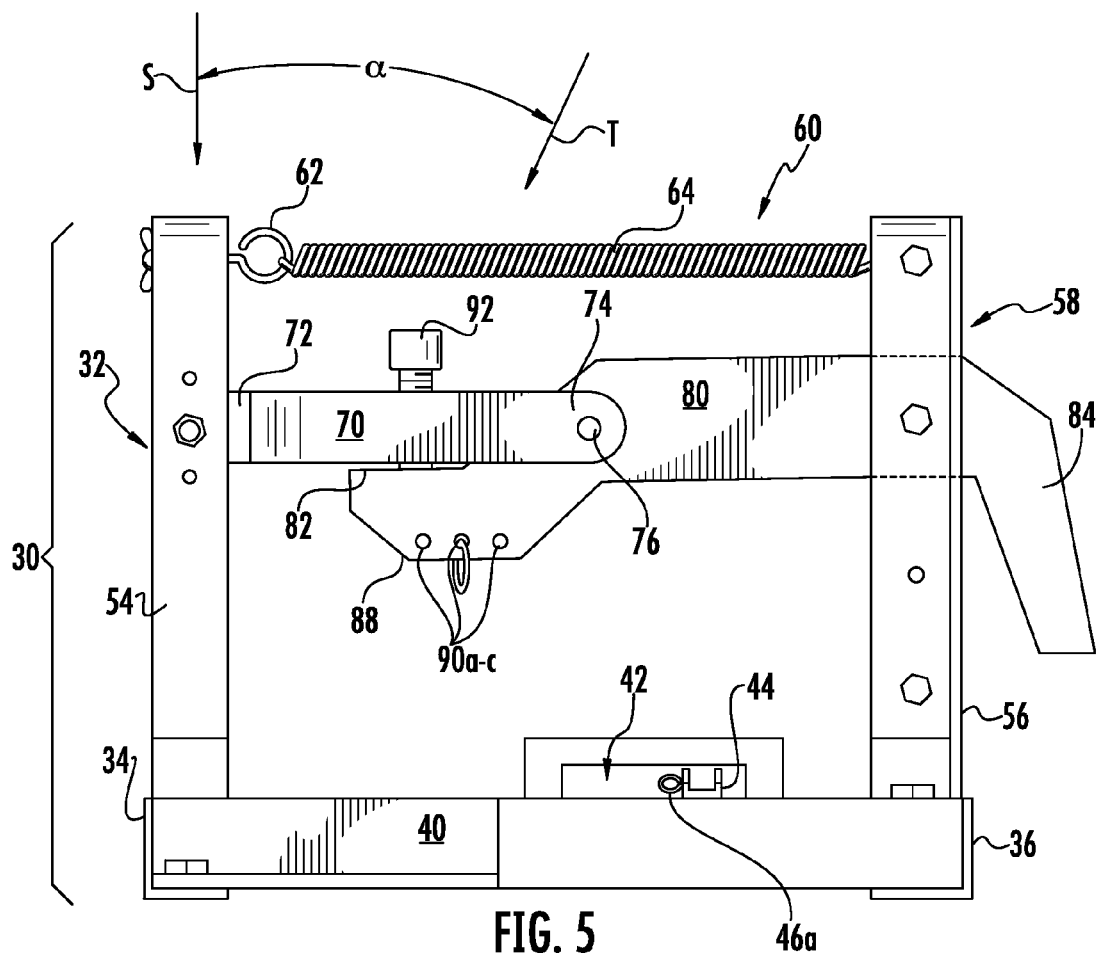
FIG. 5 is a left plan view of the first embodiment of trigger mechanism according to this invention.
Figure 5A:
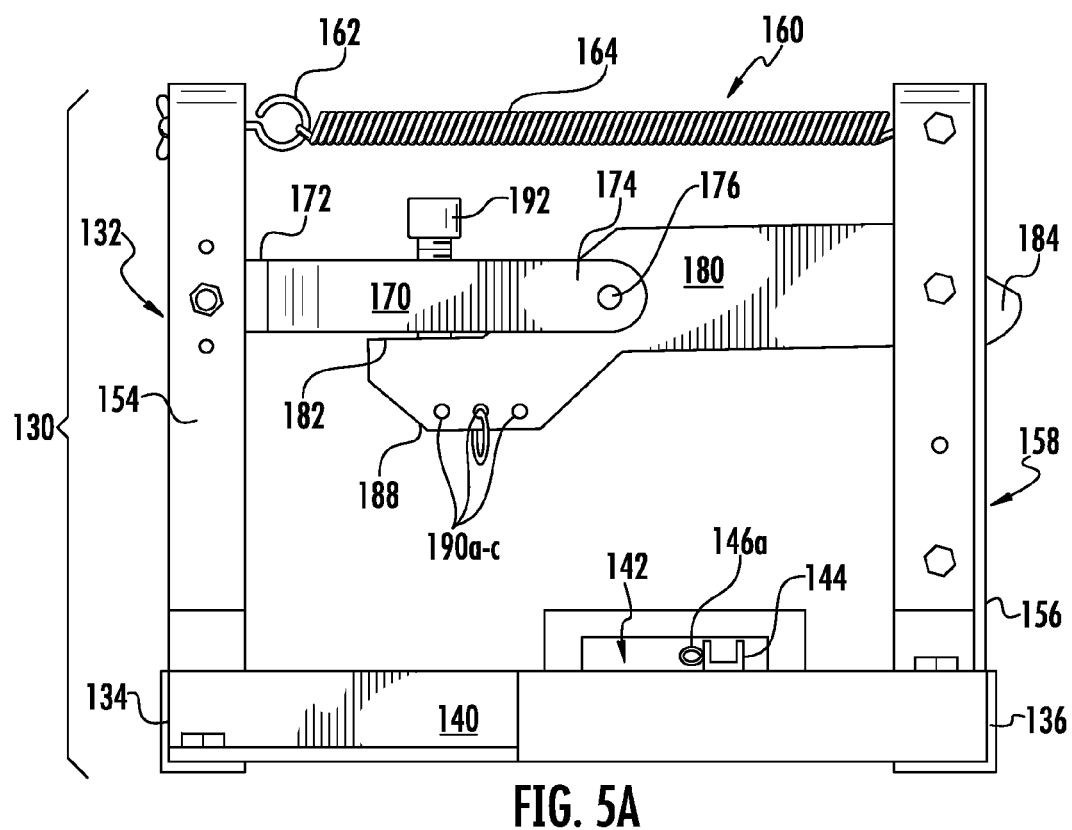
FIG. 5A is a left side plan view of a second embodiment of trigger mechanism without a side setting handle (or cock lever)
Figure 6:
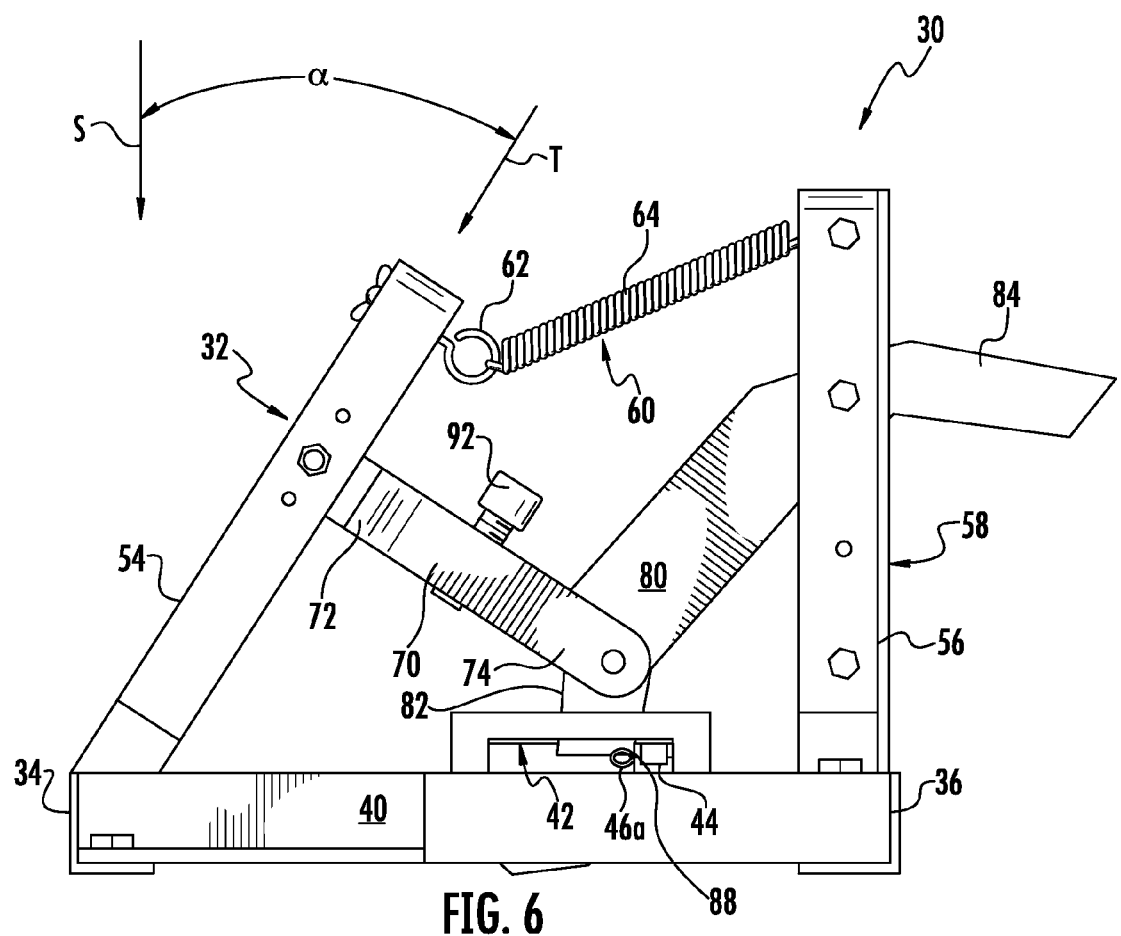
FIG. 6 is a top plan view of the first mechanism set or loaded (i.e. before triggering)
Figure 7:
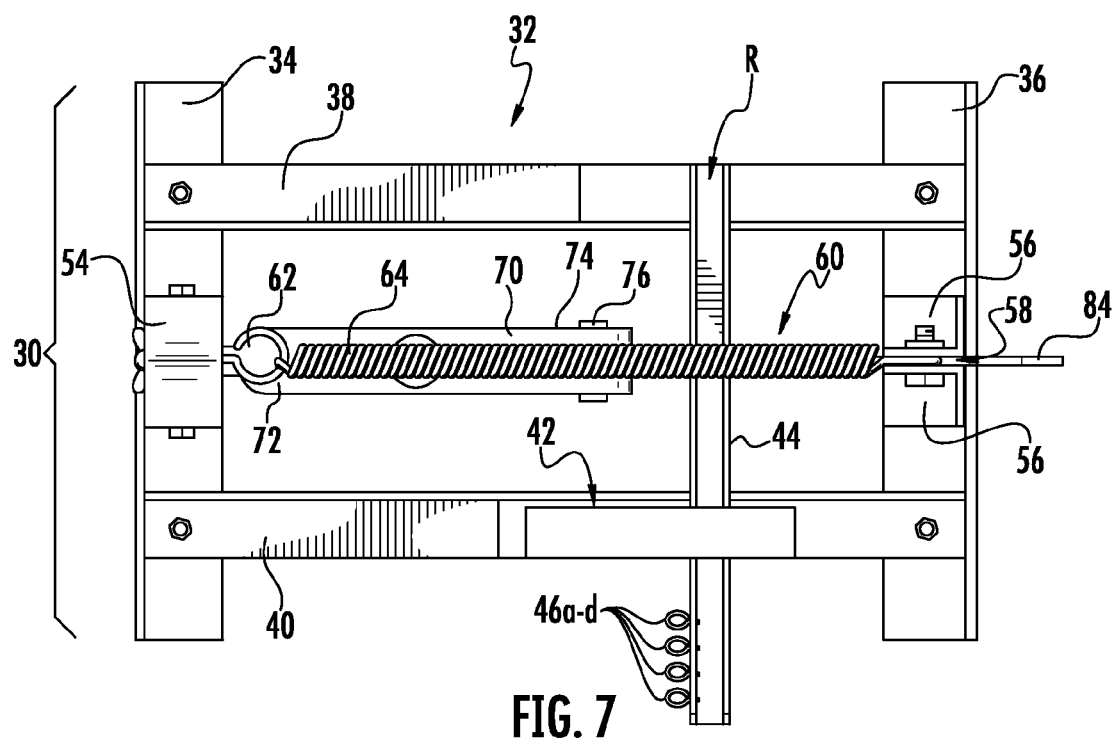
FIG. 7 is a left plan view of the first mechanism from FIG. 5 after triggering.
Figure 8:
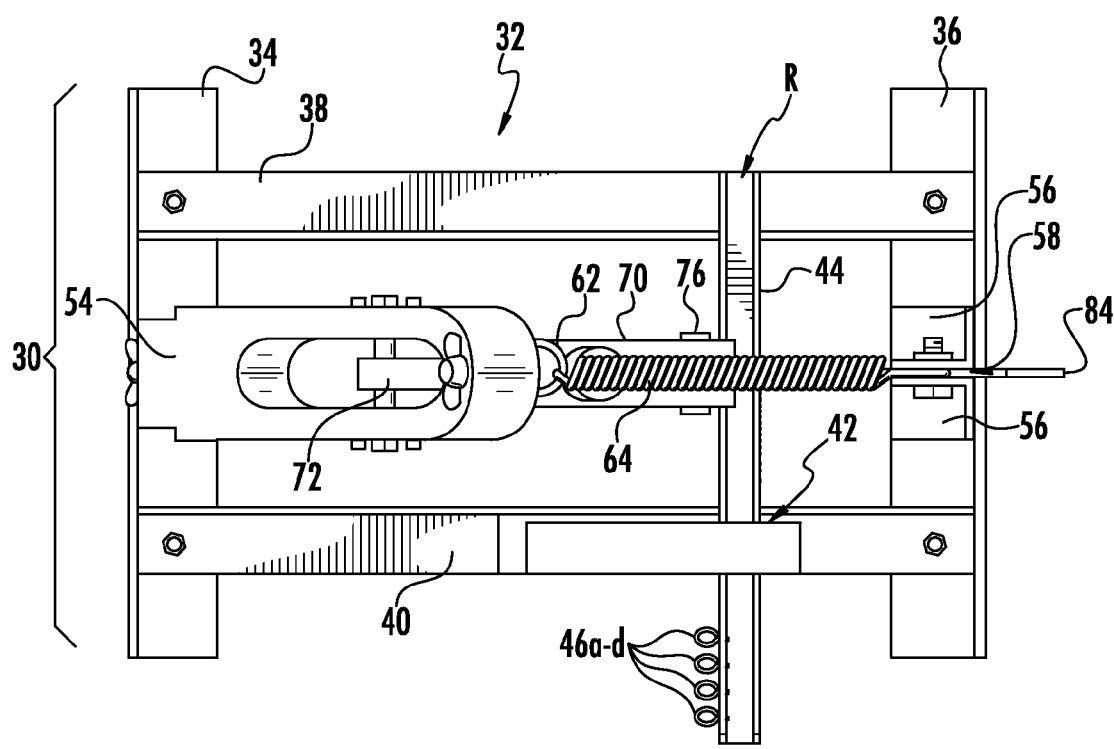
FIG. 8 is a top plan view of the triggered first mechanism from FIG. 7.
Figure 9A:
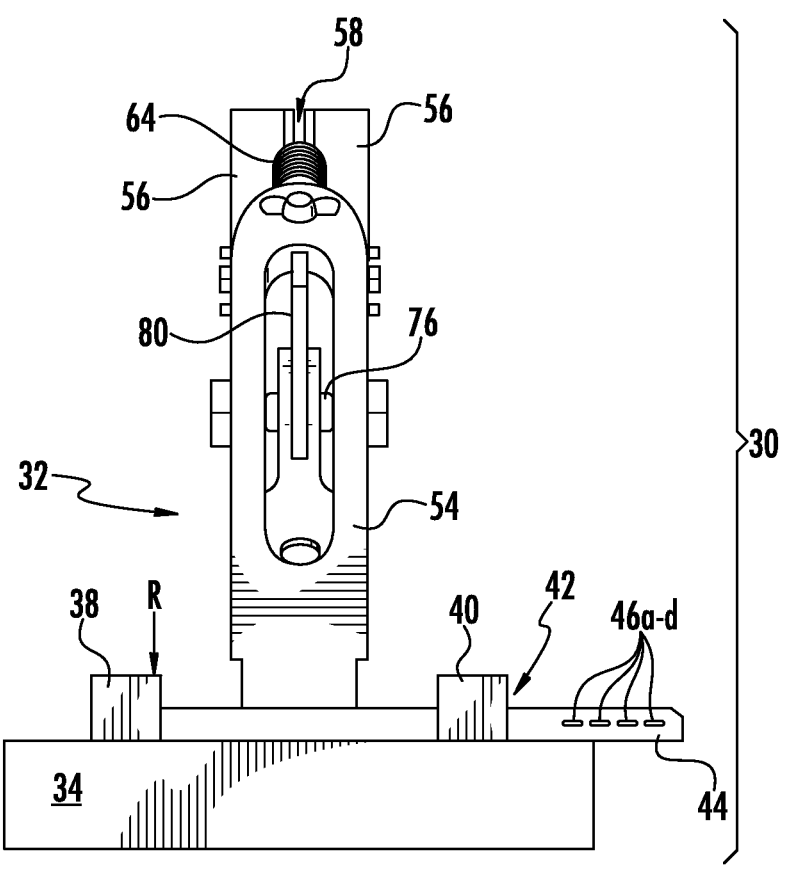
FIG. 9A is a front plan view of the triggered first mechanism from FIGS. 7 and 8.
Figure 9B:
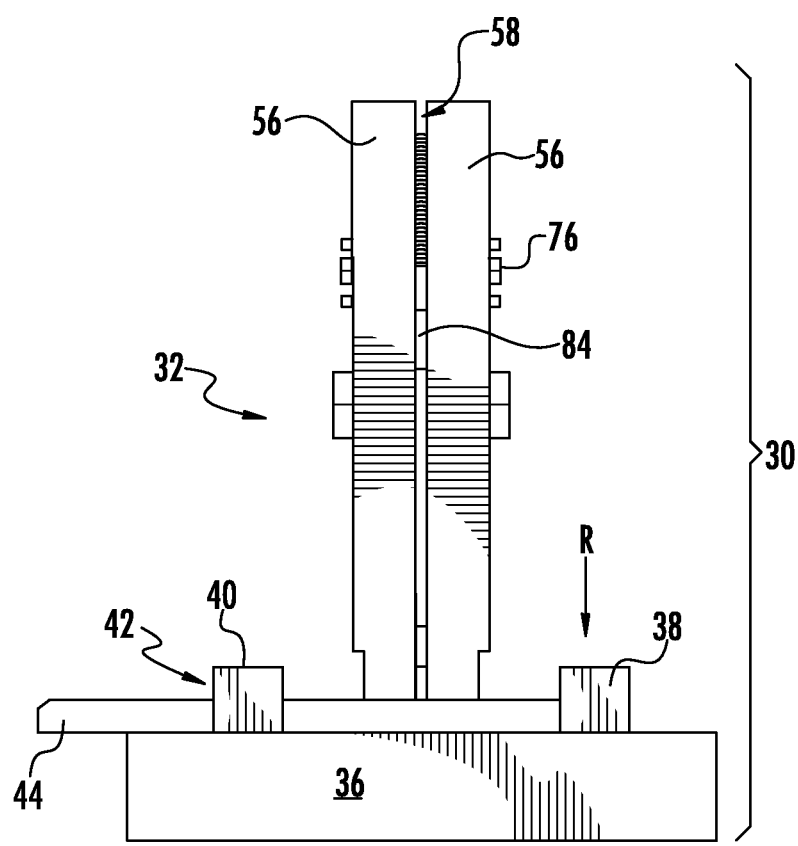
FIG. 9B is a rear plan view of the same triggered first mechanism from the opposite view of FIG. 9A.
Figure 10:
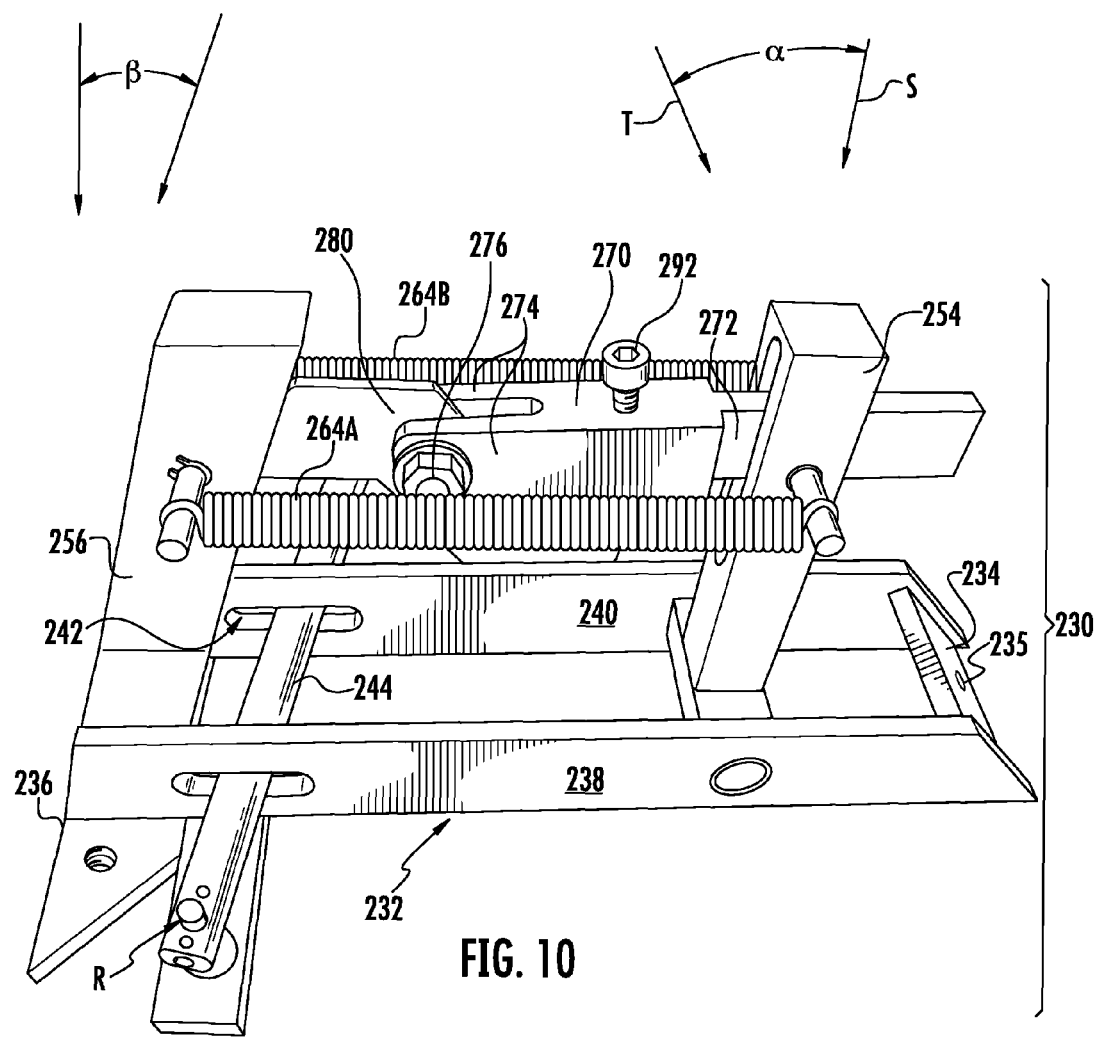
FIG. 10 is an upper right perspective view of a third embodiment of mechanism according to this invention, said third mechanism being set for actuation (i.e. before triggering)
Figure 11:
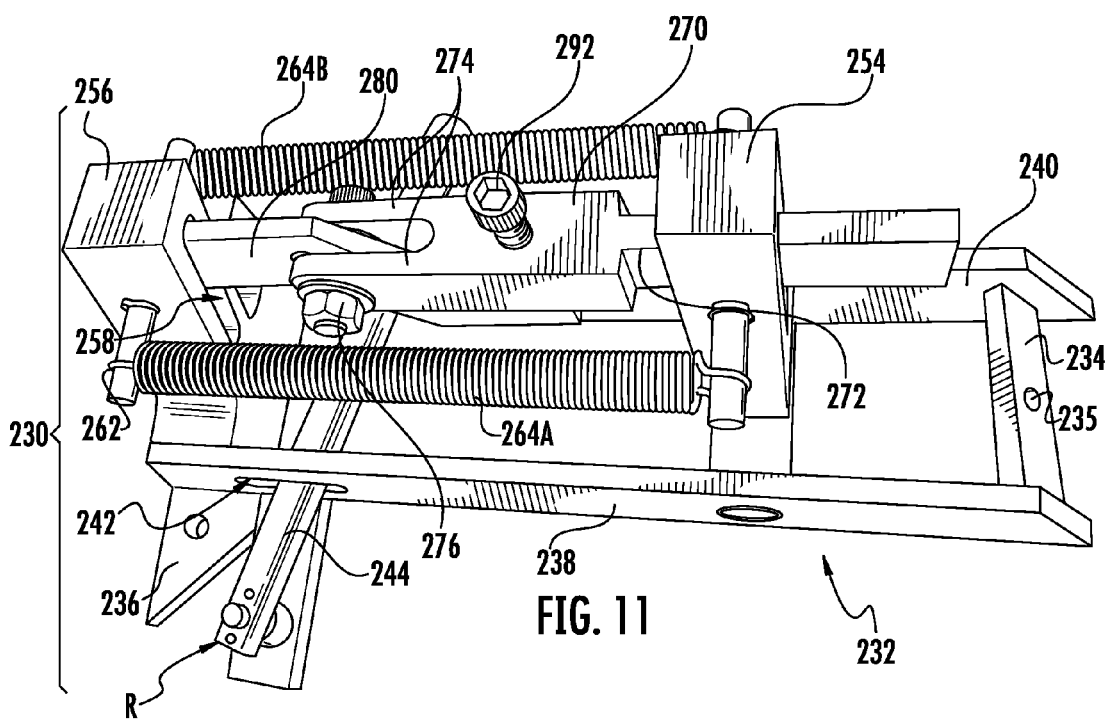
FIG. 11 is a top perspective view of the set third mechanism from FIG. 10.
Figure 12:
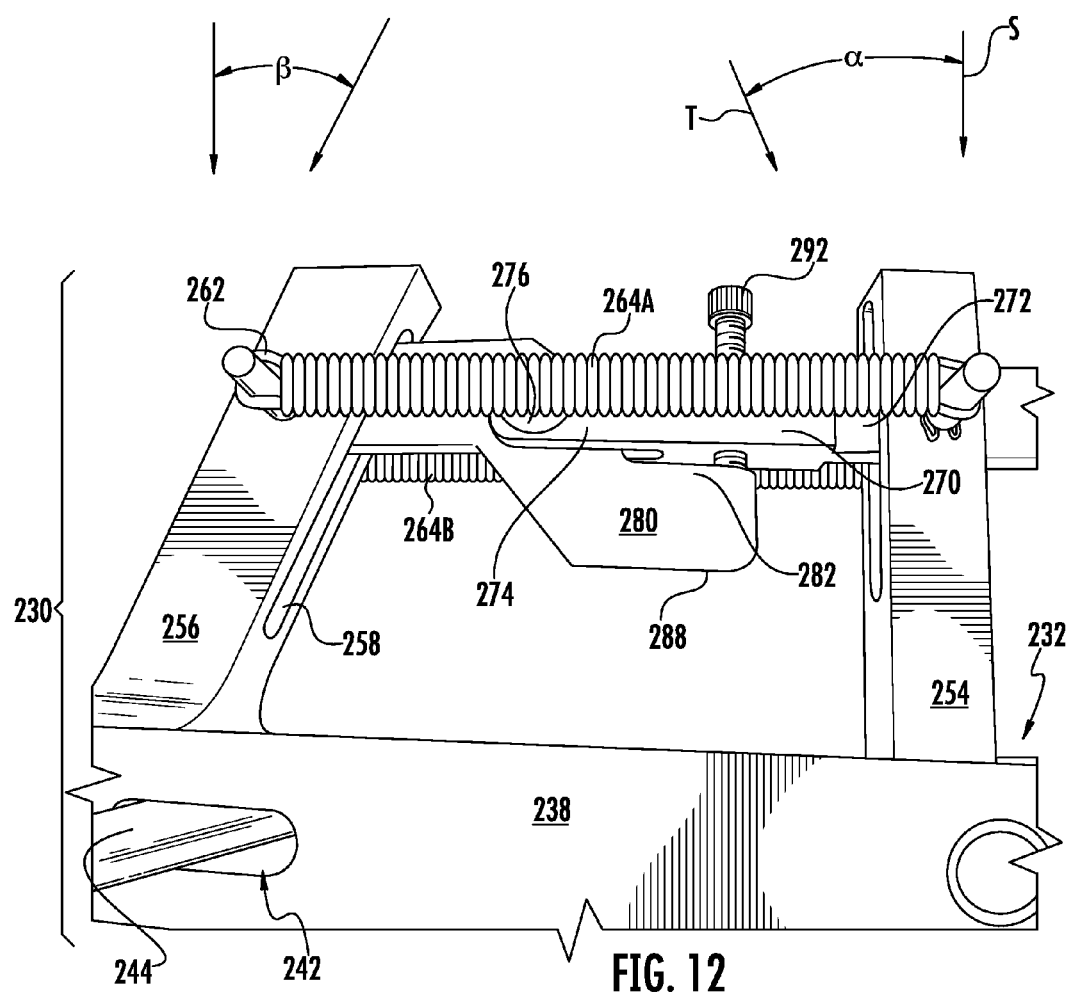
FIG. 12 is a right side plan view of the set third mechanism from FIGS. 10 and 11.
Figure 13:
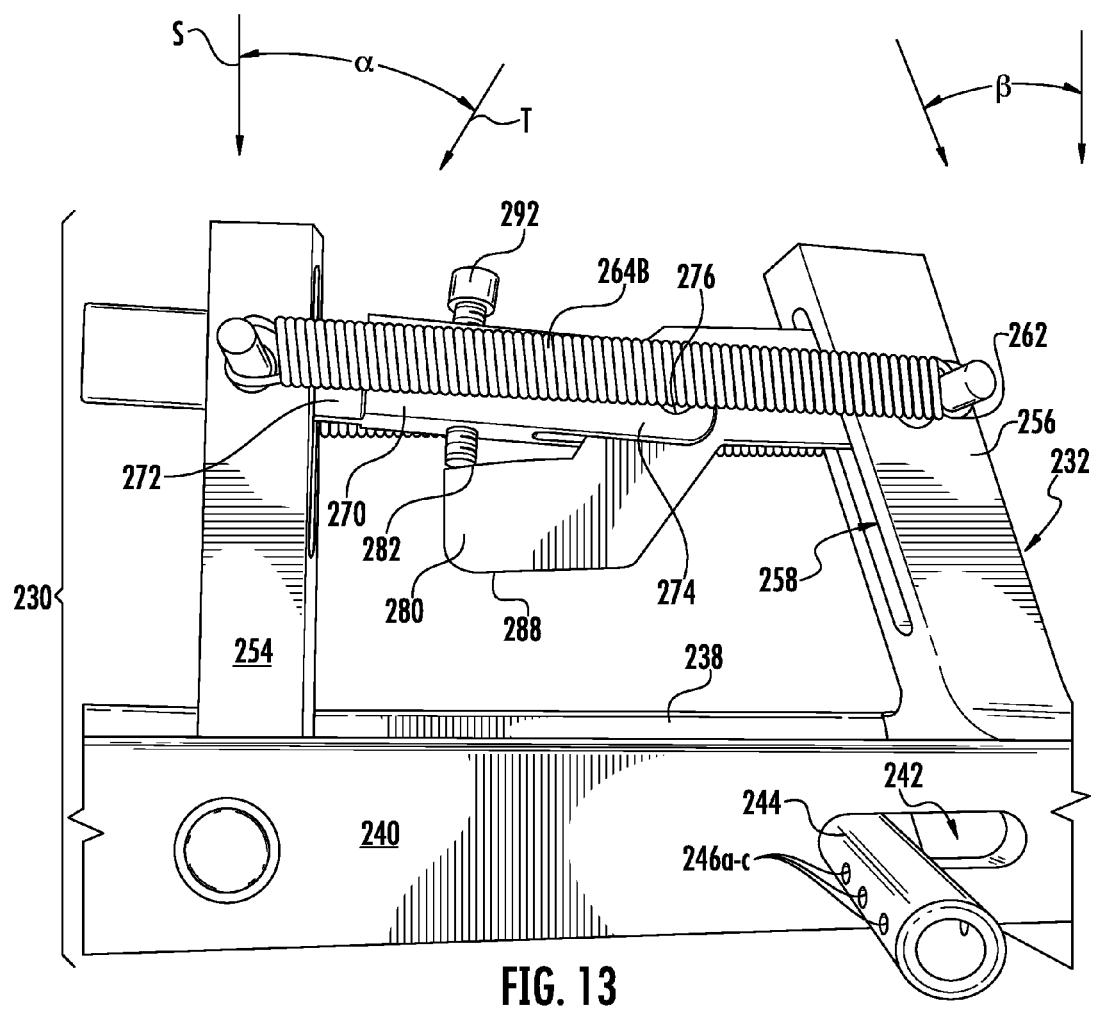
FIG. 13 is a close up, left side plan view of said set third mechanism.
Figure 14:
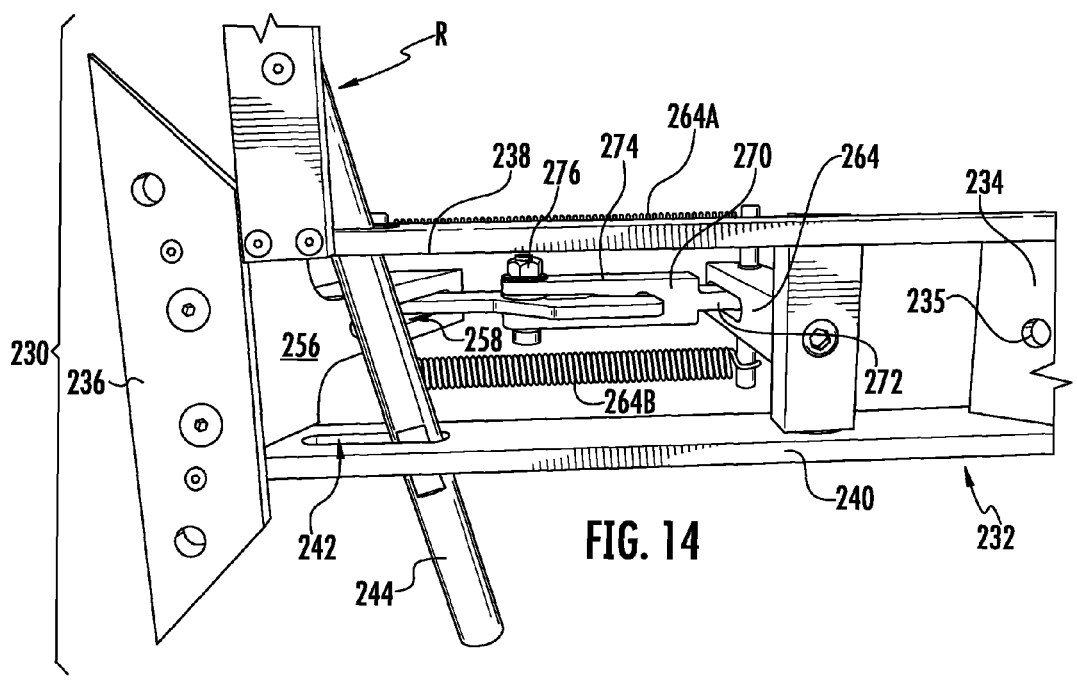
FIG. 14 is a bottom plan view of that same set third mechanism.
Figure 15:
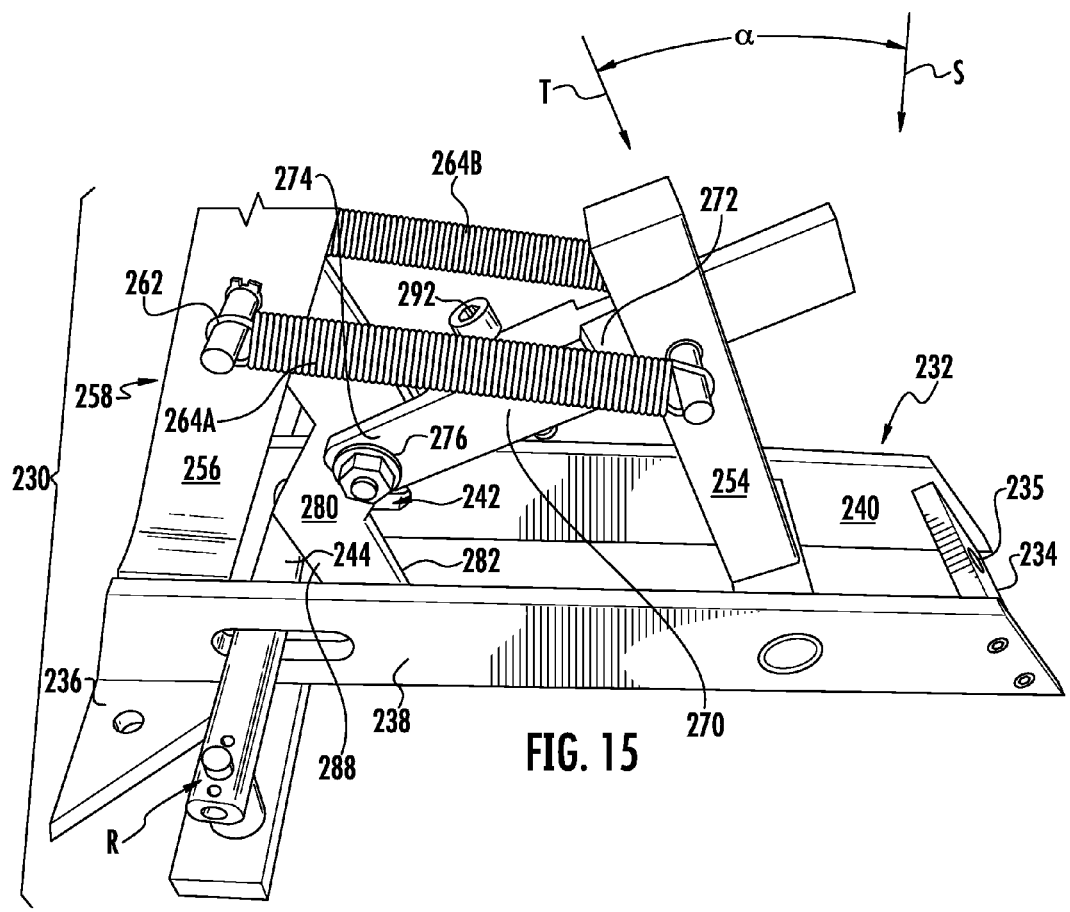
FIG. 15 is an upper right perspective view of the third mechanism from FIG. 13 after triggering.
Figure 16:
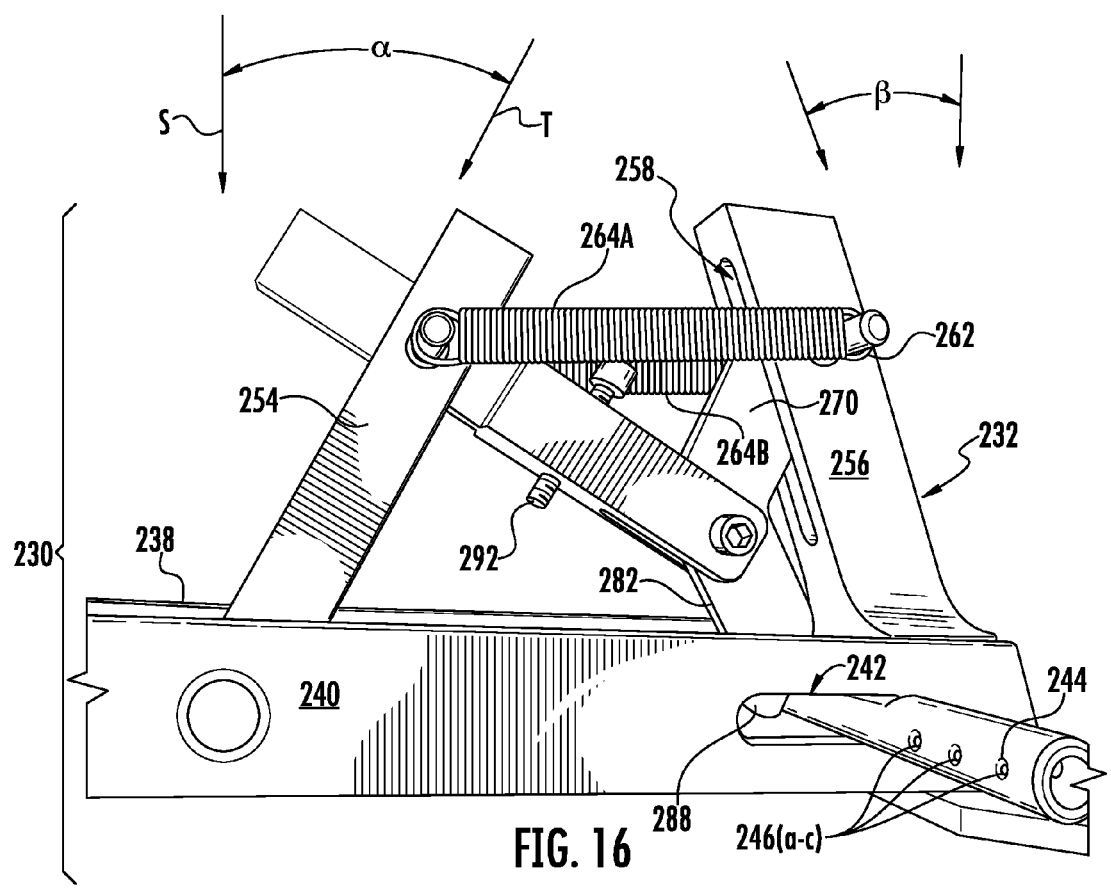
FIG. 16 is a close up, left side plan view of the triggered third mechanism.
Figure 17:
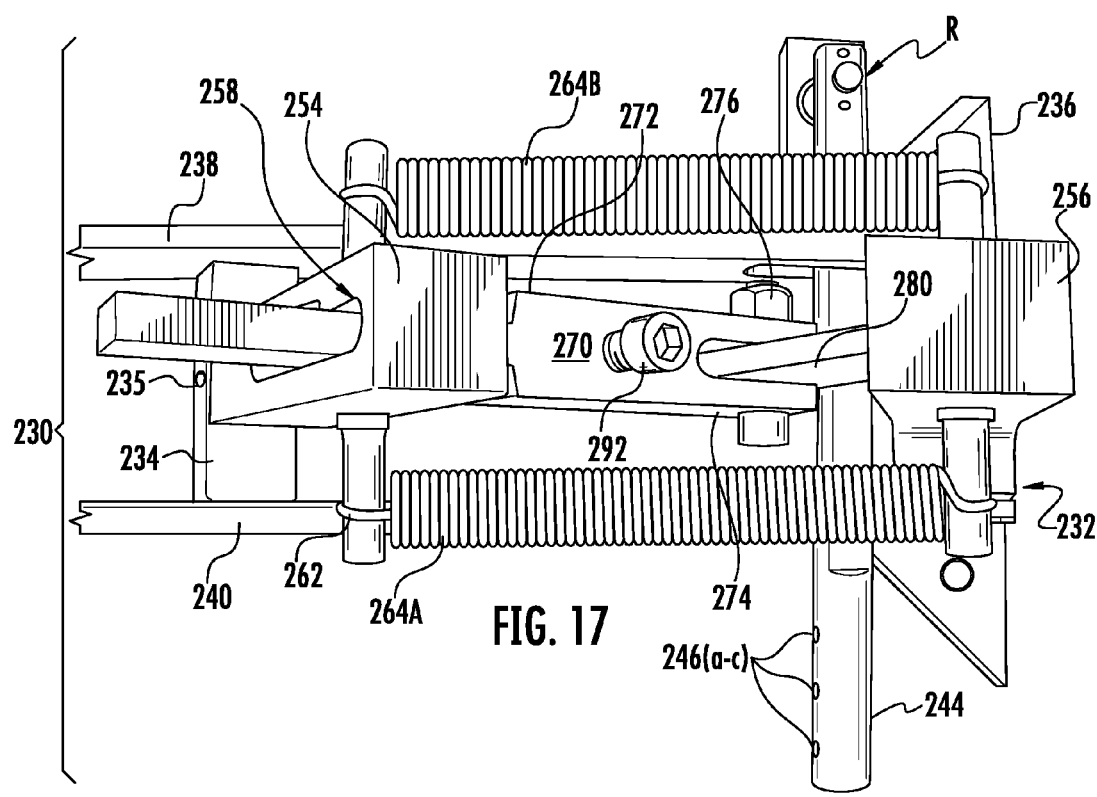
FIG. 17 is a top plan view of said triggered third mechanism.

In a first alternate embodiment (FIG. 5A), all the foregoing elements repeat except that in this simpler alternative, strike arm 180 has a forward extending end 182 but no outwardly protruding rear handle end. Rather a mere nub 184 extends partially through slot 158 in the second support 156 of that variation.

FIGS. 7 through 9B show the first preferred embodiment of mechanism 30 from various angles after it is triggered by animal contact with bait dangling in the cage proper. But for ease of illustration, these views focus on the device itself and not any other animal/cage/door link connect details.

Referring now to FIGS. 10 through 17, a second preferred embodiment of device is shown with most of the foregoing feature/elements above having corresponding equivalents (commonly numbered though in the 200 series). Some differences between versions are more artistic than technically substantive such as using a tubular shaped actuating bar/lever 244 that moves horizontally between ends of an oval shaped, slotted aperture 242 in its guide spacer 240.

The second preferred embodiment also includes relatively shorter front crossbar 234 to its main frame component 232, said cross having beveled outer edges, each with a predrilled aperture 235 for assisting with device attachment to a new or existing cage. Then, as mentioned above, a more steeply angled (i.e. less than 90 degrees to the cage top/roof) first pivot support 254 is included with this variation for giving it a more sleek, aerodynamic appearance and improved consumer aesthetics. With such angling, and a substitution of 2 side springs 264A and B for the previous versions lone top spring, shorter, more lightweight fulcrum components may be employed such as the link arm 270 and strike arm 280 illustrated.

Ideally, many of the foregoing frame components are made from metal, steel, stainless steel and/or aluminum though it is to be understood that one or more rigid plastic elements may be substituted therefor. In the first embodiment, for instance, it is envisioned that a strike arm 80 made from composite material may be integrated into the overall design of this device/invention.

To set a duly mounted mechanism on its cage trap, the combination is situated on the ground or another flat supporting surface. Its front cage door is raised and the link (through the external link cover) connected to one of the actuating lever link/hooks. Using the handle on the strike arm, the handle is raised placing the device in tension. That tension may be adjusted by hand turning the screw and testing (via multiple manual triggerings) that a sufficient amount of pressure is exerted upon reset/reloading. A bait or bait cup is then fed through the open trap and up through a hole in the cage top/roof for connecting to one of the dangling hooks from the strike arm.

According to either preferred embodiment, the fulcrum arrangement of this invention operates with "over-centering" action during trap setting and tripping. Such over-centering enables mechanism 30, 230 to operate reliably and repeatably. Tripping the set device is accomplished by providing sufficient torque to the set fulcrum levers to overcome the tripping torque thereby triggering the door latch cable and ultimately closing the cage door with the targeted animal trapped inside.

It is to be understood that the present invention is not limited to the illustrated embodiments described herein. Modifications and variations of the above described are possible as appreciated by those skilled in the art in light of the foregoing.

What is claimed is:

1. A mechanism for triggering a door of an animal cage to close, said mechanism comprising:
    A. a frame for mounting to an animal cage having a door latch, said frame including:
        (i) at least two substantially vertical supports comprising:
            a. a fixed support; and
            b. a pivotally mounted support, said two supports being connected to each other:
                1. at or near top ends thereof with tension means; and
                2. at an intermediate region with interconnecting fulcrum bars, one fulcrum bar of the fulcrum bars for the fixed support having a plurality of apertures through which a bait trap is suspended for hanging inside the animal cage;
    B. a door-actuating bar situated adjacent the fixed support fulcrum bar, said actuating bar being adapted for:
        (i) contact with said fixed support fulcrum bar when an animal contacts the bait trap inside the animal cage; and
        (ii) activating the door latch to close a door of the animal cage; and
    C. means for mounting the frame to the animal cage.

2. The mechanism of claim 1 wherein the pivotally mounted support is mounted to the frame before triggering at an angle between about 75 and 90 degrees.

3. The mechanism of claim 1 wherein the fulcrum bar for the pivotally mounted support connects at one end to said pivotally mounted support and at an opposite end to the fixed support fulcrum bar.

4. The mechanism of claim 3 wherein a fulcrum bar for the pivotally mounted support extends substantially parallel with the fixed support fulcrum bar before triggering.

5. The mechanism of claim 3, which further includes means for adjusting the amount of tension exerted from the pivotally mounted support fulcrum bar onto the fixed support fulcrum bar before triggering.

6. The mechanism of claim 1 wherein the fixed support fulcrum bar includes a trap setting handle.

7. The mechanism of claim 1 wherein the door-actuating bar is pivotally mounted at one end to the frame and situated beneath the fixed support fulcrum bar.

8. The mechanism of claim 1, which eliminates a need for cage door activation via a pedal on a floor of the cage.

9. The mechanism of claim 1 where the frame mounts to a top of the cage.

10. The trigger mechanism of claim 1 wherein the door actuation bar moves laterally beneath the strike arm substantially parallel to the top of the cage.

11. A trigger mechanism for an animal cage having a door that can be closed by linking to hanging bait, said trigger mechanism comprising:
   A. a frame for mounting to the cage, said frame including:
      i. a first support pivotally mounted at a base end thereof to the frame;
      ii. a second support fixedly mounted substantially perpendicular to the frame;
      iii. a door actuation bar pivotally mounted at one end to the frame, said actuation bar having means for connecting to a latch on the door and pulling on that latch to close the door when an animal inside the cage engages the hanging bait; and
      iv. means for connecting the first frame support to the second frame support at variably adjustable tension levels,
   said trigger mechanism further comprising:
   B. a strike arm pivotally mounted at one end to the second frame support, said strike arm having a region nearer the first frame support from which bait is hung for suspending inside the cage;
   C. a link arm pivotally mounted at one end to the first frame support and at an opposite end to an intermediate point along the strike arm; and
   D. means for mounting the frame to the top of the cage.

12. The trigger mechanism of claim 11 wherein the first support is pivotally mounted to the frame at an angle of about 90 degrees or less.

13. The trigger mechanism of claim 12 wherein the first support is pivotally mounted to the frame at an angle of about 75 degrees or greater.

14. The trigger mechanism of claim 11 wherein the strike arm and the link arm extend substantially parallel to the top of the animal cage before triggering.

15. The trigger mechanism of claim 11, which further includes means for providing adjustable levels of tension between the strike arm and the link arm before triggering.

16. The trigger mechanism of claim 11 wherein the strike arm includes a trap setting handle.

17. The trigger mechanism of claim 16 wherein the trap setting handle extends external to the second frame support.

18. A kit for converting a trapping cage having a door that closes by animal contact with a floor pedal in the cage to one wherein door closure is linked to hanging bait, said kit comprising:
   a trigger mechanism that includes:
      a. a frame for mounting to the top of said cage, said frame including:
         i. a first support pivotally mounted at its base end to the frame;
         ii. a second support fixedly mounted perpendicular to the frame;
         iii. a door actuation bar pivotally mounted at one end to the frame, said actuation bar connecting by a cable to a latch for closing the door when an animal engages with bait hanging inside the cage; and
         iv. means for connecting the first frame support to the second frame support at variably adjustable tension levels;
      b. a strike arm pivotally mounted at one end to the second frame support, said strike arm having a region nearer the first frame support from which bait may be suspended;
      c. a link arm pivotally mounted at one end to the first frame support and at its opposite end to an intermediate point along the strike arm; and
      d. means for mounting the frame to the cage.

19. The kit of claim 18, wherein the strike arm includes a trap setting handle.

20. The kit of claim 18, which further comprises a protective cover for the door latch cable.

* * * * *